Aug. 1, 1967   R. B. JACOBS   3,333,468
MASS FLOW MEASURING SYSTEM
Filed Nov. 30, 1964   3 Sheets-Sheet 2
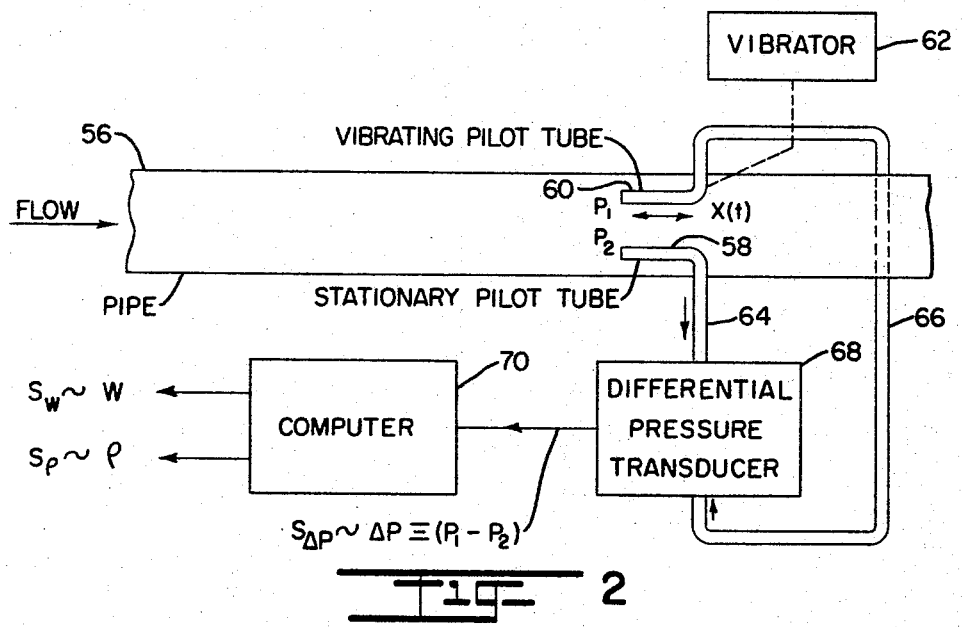
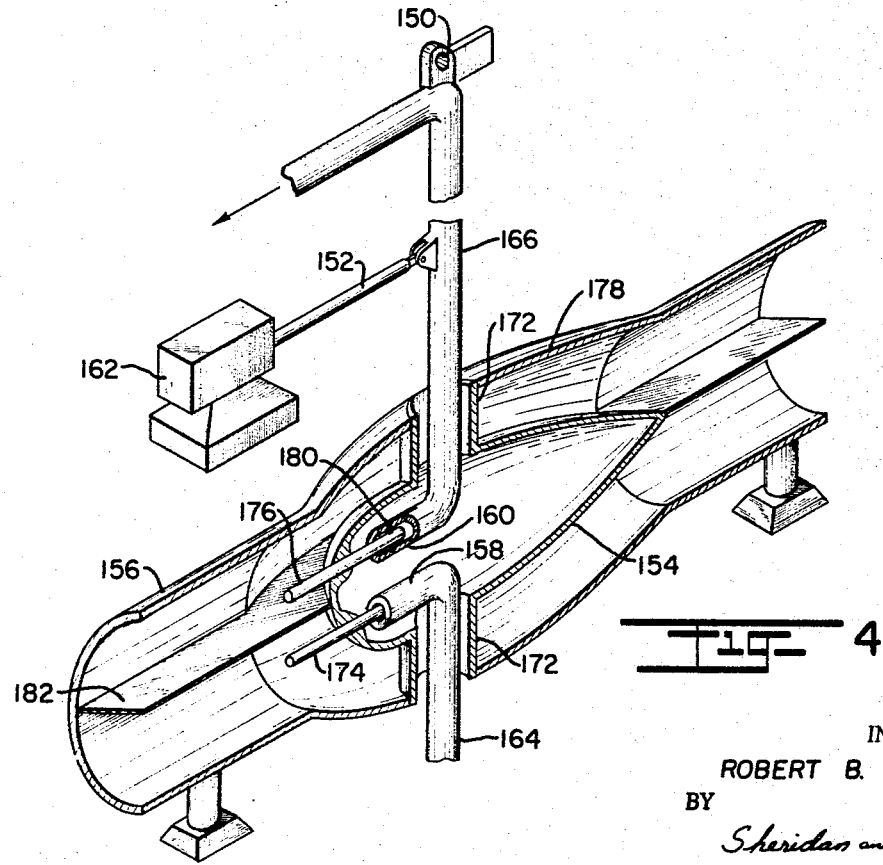
INVENTOR.
ROBERT B. JACOBS
BY
Sheridan and Ross
ATTORNEYS

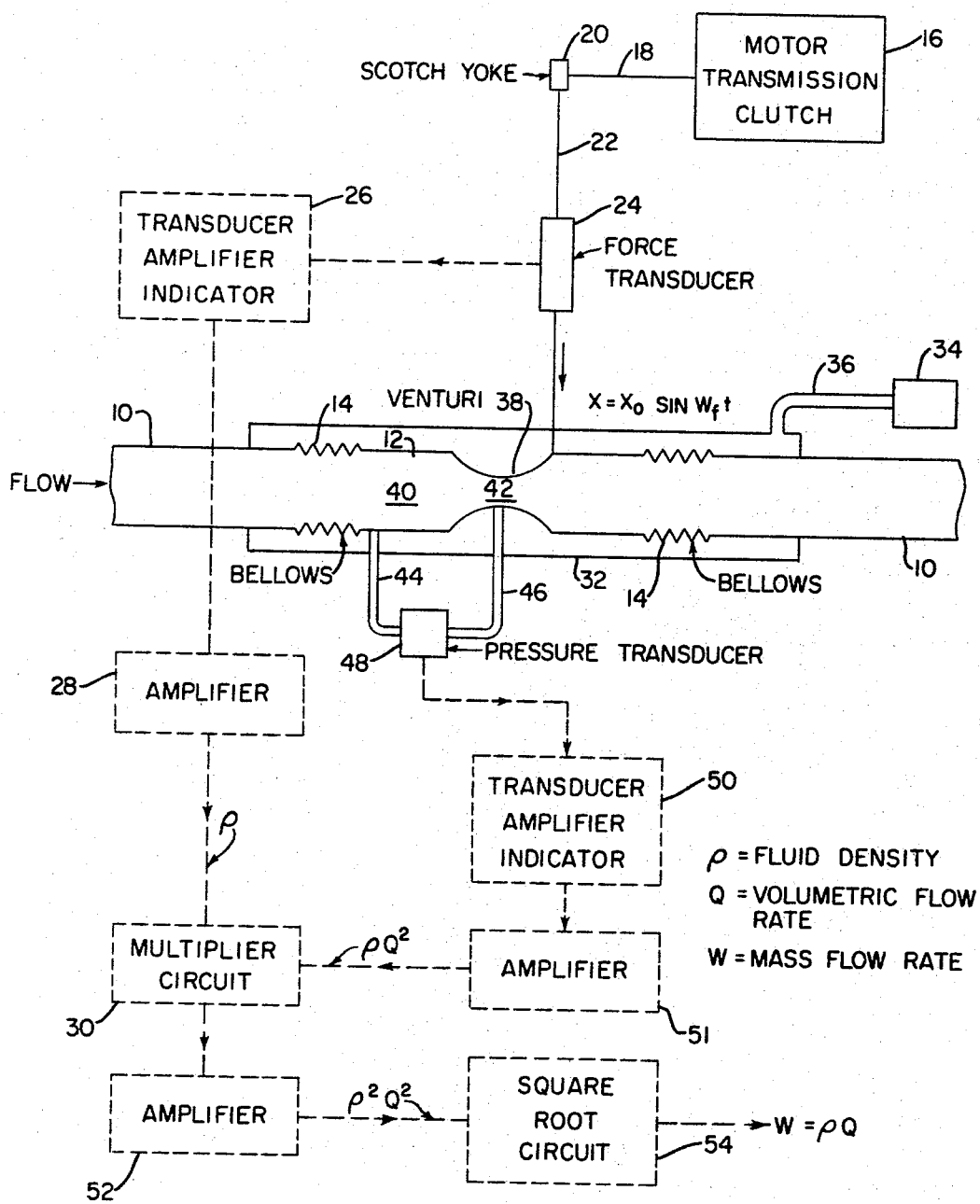

United States Patent Office 3,333,468
Patented Aug. 1, 1967

3,333,468
MASS FLOW MEASURING SYSTEM
Robert B. Jacobs, Boulder, Colo., assignor to Sundstrand Corporation, a corporation of Illinois
Filed Nov. 30, 1964, Ser. No. 414,719
3 Claims. (Cl. 73—194)

ABSTRACT OF THE DISCLOSURE

This invention relates to an apparatus for measuring the mass rate of flow of a fluid and having means for sensing a parameter of the steady state condition of the flowing fluid and transmitting a first signal indicative thereof, means for applying a translational force impulse to an increment of flowing fluid, means for sensing a parameter of the disturbed increment as a function of density and transmitting a second signal indicative thereof, and means for combining said signals to produce an indication of the mass rate of flow of the fluid.

---

This invention lies in the field of fluid flow measuring systems and is particularly directed to novel systems for measuring certain parameters of fluid flow through conduits and producing direct indications of mass rate of flow.

Several types of mass flowmeters are presently available on the market and will produce accurate indications of mass rate of flow when properly calibrated and operated in the intended manner. However, they have various disadvantages which call for further improvement in the art.

The "inferential" system employs a unit which indicates volumetric flow and another unit which indicates density. The information obtained must then be combined through computation in order to arrive at the desired rate of flow. The angular momentum system is employed in several forms. One of them utilizes a pair of axial flow turbine rotors torsionally connected together by a torsionally flexible shaft, and the twist in the shaft is proportional to the mass rate of flow. In the gyroscopic system, the fluid passes through a pipe bent in the circumference of a circle so that the fluid has an angular momentum equivalent to that of the rim of a gyroscope wheel. A precessive motion is imposed on the system and a characteristic of the resulting nutative motion is sensed. The signal is proportional to the mass rate of flow of fluid through the pipe. These systems require very accurate and delicate components which are expensive in first cost and maintenance.

The present invention in either of its preferred forms uses relatively few and simple components which are rugged and inexpensive. The principle of operation is based on Newton's Second Law but involves small-amplitude translational motion rather than rotation. In general it may be said that means are provided which "excite" increments of the fluid to be measured as it passes through a conduit by applying translational force impulses to the increments. Further means are provided which are sensitive to the steady state condition of the fluid flow and other means which are sensitive to the kinetic effects produced by the force impulses. The signals from these means are combined to produce an indication which is proportional to the mass rate of flow and can be calibrated for direct reading.

In one embodiment a section or portion of the conduit is so mounted, as by bellows, that it may be oscillated perpendicular to the axis of the conduit and of the fluid flow. A force transducer is included in the drive linkage between the conduit portion and a power source and transmits signals resulting from the kinetic force in the fluid which are proportional to the density of the fluid. Flow sensitive means, preferably in the form of a venturi, is included in the conduit and may be formed directly in the oscillatory portion. This means includes tubes communicating with the inlet and throat zones which read pressure drop as a function of density times the square of the volumetric flow rate. The two signals are multiplied to give $\rho^2 Q^2$. The square root is then taken to yield $\rho Q$, which is the mass rate of flow.

In another embodiment a pair of Pitot tubes are located in a conduit. In the preferred form they are spaced laterally from each other and both face upstream. Their open terminal ends are laterally aligned; i.e., they are in the same position axially of the conduit. Means are provided to "excite" increments of the fluid as it flows by the Pitot tube zone by applying translational force impulses in an axial direction to increments of the fluid which are immediately upstream of one of the tubes. This is preferably done by oscillating the one tube in an axial direction. The other tube is sensitive to the total pressure head of the fluid flow in its steady state condition, while the oscillating tube is sensitive to this pressure head combined with the kinetic effect of the axial translational force applied to the fluid. The pressure readings are combined and processed to produce an indication which is proportional to the mass rate of flow.

Continuous reciprocation or vibration through small amplitudes at constant frequency provides a running series of readings to indicate any variation in mass flow rate. The readings may be integrated if desired to give total mass flow.

Various other advantages and features of novelty will become apparent as the description proceeds in conjunction with the accompanying drawings, in which:

FIGURE 1 is a diagrammatic illustration of a first form of the invention;

FIGURE 2 is a diagrammatic illustration of a second form of the invention;

FIGURE 4 is a schematic perspective view of a modified physical embodiment of the second form of the invention.

Figure 3:
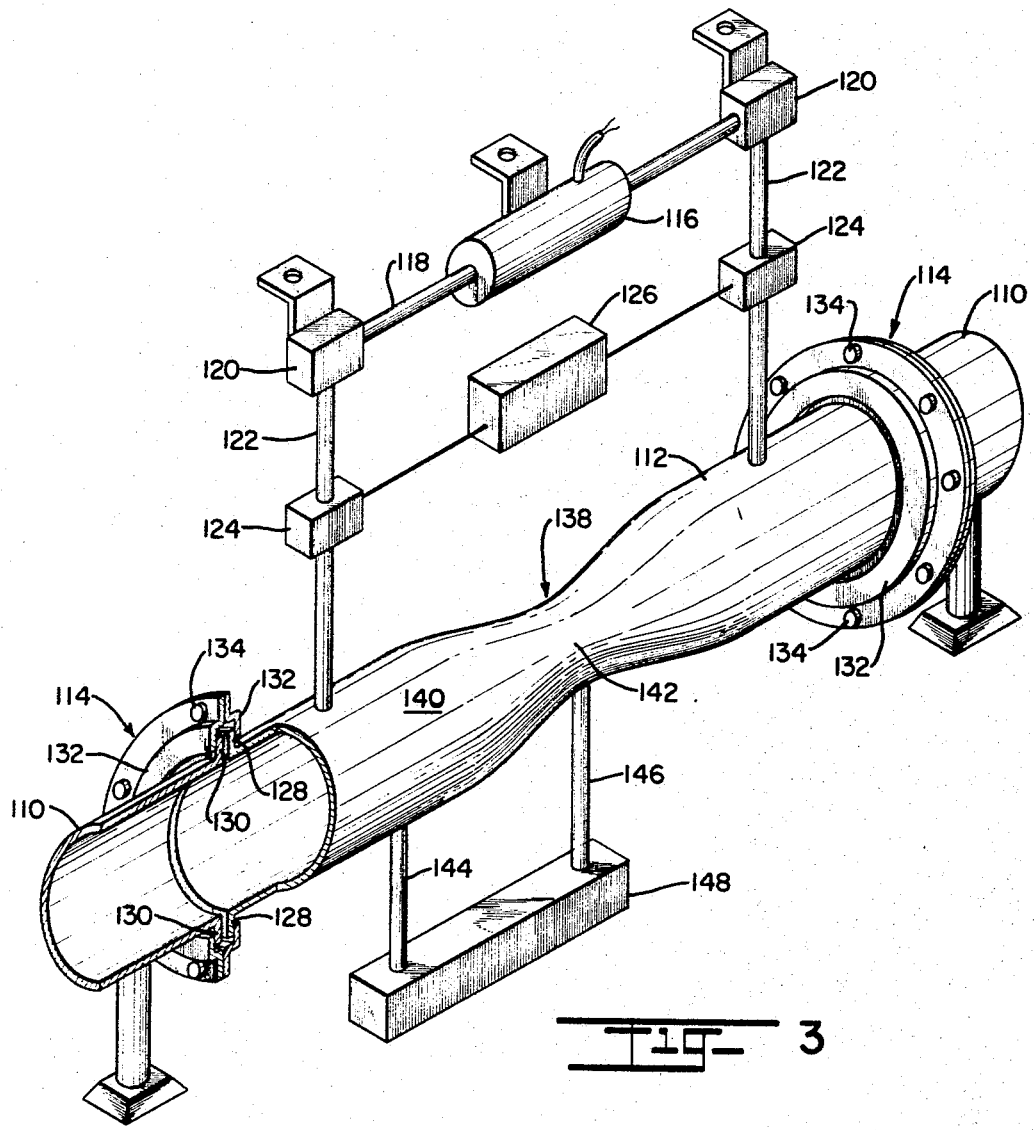
FIGURE 3 is a schematic perspective view of a modified physical embodiment of the first form of the invention.

The system illustrated diagrammatically in FIGURE 1 includes a conduit 10 for the flow of various fluids from a supply zone to a receiving zone. At some point along the length of the conduit, the section or conduit 12 is formed and is connected to the main body of the conduit by flexible bellows 14 which permit translation of the section laterally, preferably perpendicularly, of the axis of the conduit. A power source 16 including a motor, transmission, and clutch rotates shaft 18 to drive Scotch Yoke 20 which in turn causes axial reciprocation of linkage 22.

The reciprocation of the linkage causes lateral translation of section 12 together with the increment of fluid momentarily contained therein. The motion may be a single or occasional impulse, but preferably is a continuous reciprocation at constant frequency and amplitude. It has been found that good results are obtained with a frequency in the range from about ten cycles per second to about thirty cycles per second and with amplitudes which are a minor fraction of the diameter or maximum lateral dimension of the conduit.

A force transducer 24 is built into the linkage and has a spring rate selected for proper cooperation with the loads imposed on it. With suitable filtering it can reflect the weight of the fluid contained in conduit portion or section 12 and thus can transmit to the transducer-amplifier-indicator 26 a signal proportional to $\rho$, the density of the fluid. The signal is passed on to amplifier 28 and multiplier 30.

Bellows 14 provide a flexible, sealed joint between conduit body 10 and section 12 to permit the small lateral motion required. In one version of the device the conduit has an inside diameter of about one inch and the amplitude of movement is about .040 to .050 inch. Variations in fluid pressure and rate of flow tend to modify the effective spring constant of the bellows and produce false readings in the force transducer. This effect can be reduced or eliminated by the provision of pressure casing 32 surrounding the bellows and section 12. A source of gas under pressure, 34, is connected by pipe 36 to the casing to provide a gas pressure around the bellows and section 12 substantially equal to the fluid pressure.

Venturi 38, which is formed in conduit portion 12, has an inlet zone 40 and throat zone 42. Pipes 44 and 46 are connected to these zones to sense the fluid pressures and transmit them to pressure transducer 48. The resultant signal, which is proportional to the product of the density and the square of the volumetric flow rate, is fed to amplifiers 50 and 51 and thence to multiplier 30. The product of the multiplier, $\rho^2 Q^2$, passes to the amplifier 52 and thence to square root unit 54. The output of the latter is $\rho Q = W$ = mass rate of flow, which is the value sought.

The system illustrated diagrammatically in FIGURE 2 includes a conduit 56 for the flow of various fluids from a supply zone to a receiving zone. Two Pitot tubes 58 and 60 are mounted in the conduit with their open ends facing upstream. Tube 58 is stationary in the conduit while tube 60 is so mounted that it can reciprocate axially as indicated. It is actuated by vibrator 62, which may be essentially the same power source and drive means as shown in FIGURE 1 except that no force transducer need be provided.

The open, terminal ends of Pitot tubes 58 and 60 are located in the same position axially of the conduit and the tubes themselves are laterally spaced as shown. The lateral spacing tends to prevent interaction between the tubes, and the equal axial positioning insures against a possible static pressure drop between two tubes which are axially spaced a substantial distance apart. Such static pressure drop can be undesirably large compared to the mass flow signal, and is itself a complex function of flow.

Actuation of tube 60 either in a single or occasional impulse or, as preferred, in a continuous reciprocation at constant frequency and amplitude, "excites" an increment of fluid in the flow immediately upstream of the terminal end of the tube by applying a translational force impulse thereto. This increases the kinetic energy of the increment as a function of the density of the fluid.

Tube 58 senses the total pressure of the flow stream in its steady state condition, including a velocity factor. Tube 60 senses the same total pressure combined with the kinetic force resulting from the translational impulse, which includes a density factor. These two pressures are led by pipes 64 and 66 to differential pressure transducer 68 which produces a signal $S_{\Delta P}$ which varies with the pressure difference between the two Pitot tube readings. This signal is transmitted to computer 70 which, by known means, converts the signal to indications of mass rate of flow, or density, or both if desired.

In one version of the Pitot tube type of meter, good results are obtained with a conduit having an inside diameter of about one and a quarter inches and Pitot tubes having an O.D. of ¼ inch and an I.D. of 3/16 inch. The same range of frequencies is suitable, with about twenty cycles per second preferred in both types. The amplitude of movement of the Pitot tube is about .20 inch.

The actual upper and lower limits of flow rate which will provide satisfactory operation have not been established, but it appears that the Reynolds number should be fairly high, preferably greater than $8 \times 10^4$.

Both of the types of flowmeter systems described above have various advantages. Since they sample the flow continuously they immediately call attention to changes in mass flow and density which, in various mixing operations, may call for immediate correction. The Pitot tube type is extremely simple in construction, which is always a desirable feature. Because it samples only a small part of the cross section of the conduit, the fluid must be quite homogeneous to insure accuracy.

The venturi type system is slightly more complicated but it is still basically simple and straightforward. Since it samples the full cross section and has such a large volume compared to the cross section, it might be said that it samples all of the fluid that passes through the conduit. Thus it gives a better average of density or mass flow, and can measure equally readily fluids which are quite heterogeneous, including sludges.

With either type of system the indications produced can be recorded on moving chart paper or fed to an integrator which will continuously give an indication of total mass flow.

FIGURE 3 illustrates schematically a physical embodiment of a flowmeter which is basically the same as that of FIGURE 1 with a few minor variations. Conduit 110 carries fluid flowing from a supply zone to a receiving zone. The continuity of its main body is interrupted by section or portion 112 which is mounted to the main body for lateral translation with respect thereto by slide joints 114. As in the case of FIGURE 1, power source 116 acts through shafts 118 to operate Scotch yokes 120 and linkages 122, which include force transducers 124. The linkages are connected to section 112 near its ends to shake or vibrate it laterally. Suitable lines connect the force transducers to transducer-amplifier-indicator 126 and thence to additional circuitry as in FIGURE 1.

Slide joints 114, which provide the freedom of lateral movement, are identical. Each includes flanges 128 and 130 on the adjacent ends of conduit 112 and section 110 respectively. Clamp rings 132 are proportioned to just contact the flanges and hold them in snug sliding engagement when rings 132 are tightly secured together by fasteners 134. Any suitable labyrinth or other type seal may be used between the sliding faces of flanges 128 and 130.

Venturi 138 is formed in section 112 and operates in the same way as venturi 38 in FIGURE 1. It has an inlet zone 140 and throat zone 142. Pipes 144 and 146 are connected to these zones to sense the fluid pressures and transmit them to pressure transducer 148, which produces a signal to be passed on to the electronic circuitry.

FIGURE 4 illustrates schematically a physical embodiment of a flowmeter which is basically the same as that of FIGURE 2 with a few modifications. It includes a conduit 156 for the flow of various fluids from a supply zone to a receiving zone. Two Pitot tubes 158 and 160 are mounted in the conduit with their open ends facing upstream. Tube 158 together with its supporting tube 164 is stationary in the conduit, while tube 160 with its supporting tube 166 is mounted for movement about pivot 150 in response to forces applied through link 152 by power source 162. Pipes 164 and 166 lead to a differential pressure transducer and thence on to other electronic circuitry as in FIGURE 2.

In order to reduce flow turbulence the Pitot tubes 158 and 160 are mounted within an ovoid streamlined casing 154 having streamlined struts 172 to support it in the conduit. Tube 158 has a reduced diameter terminal portion 174 which just extends through the casing. Tube 160 is provided with a similar reduced diameter terminal portion 176. It will be seen that they have practically no effect on the total cross sectional shape of the casing 154. In order to reduce flow turbulence to the minimum, section 178 of the conduit is enlarged in a streamline form. At every station along its axial length its cross sectional area is matched exactly to the cross sectional area of casing 154 at the corresponding station, including struts 172, so that the cross sectional area of the flow path will be constant.

Terminal portion 176 may be fixed and sealed in tube 160 and slidably mounted in the casing 154 for limited axial movement. The radius of movement about pivot 150 is relatively very long, the amplitude of movement of portion 176 is very small, and the tubes 160 and 166 may be slightly flexible. Consequently the pivotal movement can be converted to the limited straight line movement without difficulty.

In a slight variation, portion 176 may be fixed in casing 154 as shown, so that it does not cyclically project out into the flow stream to change the cross sectional area. In this case, tube 160 is provided with a seal 180, such as an O-ring, and slides back and forth on the aft end of member 176. The change in displacement ejects fluid from the open end of member 176 and applies a translational force impulse to the oncoming increment of fluid, producing the same kinetic force produced by actual movement of member 176.

Since unit 174 is intended to sense the steady state condition it is desirable to protect it from even small disturbances caused by the excitation of fluid upstream of unit 176. Segregation is accomplished by provision of a partition 182 which is arranged diametrally of the conduit and at right angles to a plane containing both of the Pitot tubes. It extends upstream far enough to eliminate disturbances, generally two to three conduit diameters, and may extend downstream a shorter distance. It may, of course, be used with or without the streamline casing 154. When the latter is present, the partition preferably extends slightly beyond the aft end.

It will be apparent to those skilled in the art that various changes and modifications may be made in the construction and arrangement of parts as shown and described without departing from the spirit of the invention, and it is intended that all such changes and modifications shall be embraced within the scope of the following claims.

I claim:

1. Apparatus for measuring the mass rate of flow of a fluid, comprising: a conduit for transmitting fluid from a supply zone to a receiving zone; a portion of said conduit being mounted for translational movement in a direction laterally of its longitudinal axis; force applying means to apply a translational force impulse in said lateral direction to said conduit portion and to the fluid momentarily contained therein, said force applying means including a power source and drive linkage connected between said power source and said conduit portion; a force transducer in said drive linkage adapted to sense the force applied to said fluid and to transmit a signal proportional to the density of the fluid; means connected to said conduit portion and communicating with the fluid flowing therethrough to sense a parameter of the steady state flow and transmit a signal proportional to the product of the density and the square of the volumetric flow rate of said fluid; a multiplier unit for multiplying said signals; and a square root unit for deriving the square root of the product of said multiplier unit; said square root constituting the mass rate of flow of said fluid.

2. Apparatus as claimed in claim 1; said conduit portion comprising a venturi section; and said parameter sensing means including conduit members communicating with said venturi section at its inlet and throat zones to sense the pressure drop therebetween.

3. Apparatus as claimed in claim 1; said force applying means being continuously movable to reciprocate said conduit portion at constant frequency and amplitude.

References Cited

UNITED STATES PATENTS

| 2,632,327 | 3/1953 | Smith | 73—194 |
|---|---|---|---|
| 2,703,497 | 3/1955 | Carney | 73—211 X |
| 2,772,567 | 12/1956 | Boden et al. | 73—231 |
| 2,779,193 | 1/1957 | Lee | 73—194 X |
| 2,943,476 | 7/1960 | Bernstein | 73—194 X |
| 3,049,919 | 8/1962 | Roth | 73—228 |
| 3,138,955 | 6/1964 | Uttley | 73—194 X |
| 3,218,851 | 11/1965 | Sipin | 73—194 X |

RICHARD C. QUEISSER, *Primary Examiner.*

E. D. GILHOOLY, S. A. WAL, *Assistant Examiners.*